United States Patent
Johnson

(10) Patent No.: US 8,571,996 B2
(45) Date of Patent: Oct. 29, 2013

(54) APPARATUS AND METHOD FOR SECURED COMMERCIAL TRANSACTIONS

(75) Inventor: Neldon P. Johnson, Salem, UT (US)

(73) Assignee: N.P. Johnson Family Limited Partnership, Pleasant Grove, UT (US)

( * ) Notice: Subject to any disclaimer, the term of this patent is extended or adjusted under 35 U.S.C. 154(b) by 871 days.

(21) Appl. No.: 11/788,835

(22) Filed: Apr. 20, 2007

(65) Prior Publication Data
US 2008/0262973 A1 Oct. 23, 2008

(51) Int. Cl.
*G06Q 20/00* (2012.01)
(52) U.S. Cl.
USPC ............. 705/76; 705/35; 705/318; 705/64; 705/50; 340/5.52; 382/115; 713/186; 726/2; 902/3

(58) Field of Classification Search
USPC .......................................................... 705/76
See application file for complete search history.

(56) References Cited

U.S. PATENT DOCUMENTS

| | | | | |
|---|---|---|---|---|
| 5,764,789 A * | 6/1998 | Pare et al. | | 382/115 |
| 6,307,956 B1 * | 10/2001 | Black | | 382/124 |
| 2002/0174348 A1 * | 11/2002 | Ting | | 713/186 |
| 2003/0106935 A1 * | 6/2003 | Burchette, Jr. | | 235/380 |
| 2004/0237669 A1 * | 12/2004 | Hayward et al. | | 73/862.624 |

FOREIGN PATENT DOCUMENTS

JP 2004138416 A * 5/2004

OTHER PUBLICATIONS

Anil K. Jain et al. Introduction to Biometrics. 2001. Retrieved online Sep. 12, 2013.*

* cited by examiner

*Primary Examiner* — James A Reagan
(74) *Attorney, Agent, or Firm* — J. David Nelson

(57) ABSTRACT

A transaction security code database and a method and apparatus for generating the transaction security code database. The transaction security code database is comprised of multiple transaction security codes, each transaction security code constituting a transaction code generated based upon a transaction initiated by a user, which is appended to or linked to a security code which is based upon a biometric sensor code generated by a biometric sensor from a biometric presentation of a biometric feature of the user.

12 Claims, 4 Drawing Sheets

APPARATUS AND METHOD FOR SECURED COMMERCIAL TRANSACTIONS

FIELD OF THE INVENTION

This invention is in the field of digital computer databases and in particular digital computer databases for commercial transactions and methods for generating and using such databases.

BACKGROUND OF THE INVENTION

Every modern commercial transaction, including sale and purchase transactions and payment transactions, utilizing a credit card, debit card, or other electronic validation, verification, or payment authorization, results in the generation of a digital transaction code. That transaction code is used for a number of purposes, such as authorizing the charge of the transaction to a credit card account or authorizing the electronic transfer of funds from one account to another to pay for the transaction. Unauthorized access to such transaction codes can and is used to misappropriate or misdirect the transaction code and the financial transactions intended to follow the commercial transaction. Access to user account information, vendor account information, or other information related to the transaction may enable such unauthorized access. A transaction database and a method for generating and using such database is needed that will prevent unauthorized access to and use of the transaction code.

It is therefore an object of the present invention to provide a transaction database of unique transaction security codes wherein each transaction security code is comprised of a unique digital biometric security code, generated from a biometric feature of a user, which is appended or linked to a transaction code from a transaction engaged in by the user.

It is a further object of the present invention to provide a method for generating a unique transaction security code for a transaction engaged in by a user by generating a unique digital biometric security code from a biometric feature of a user and appending or linking the security code to a transaction code from the transaction.

It is a further object of the present invention to provide an apparatus for generating a unique transaction security code for a transaction engaged in by a user by generating a unique digital biometric security code from a biometric feature of a user and appending or linking the security code to a transaction code from the transaction.

SUMMARY OF THE INVENTION

The method and apparatus of the present invention provide for the generation of a transaction security code for a transaction. The transaction security code is comprised of a transaction code and a security code. The data base of the present invention includes a plurality of stored transaction security codes. A user initiates a transaction which can be one of any number of common commercial or financial transactions, such as a retail purchase with a debit card, an on-line purchase with a credit card, an on-line banking transaction, or a loan application. The transaction code will ordinarily be in a digital format defined by the commercial entity with whom the user is interacting for the transaction and by the financial institution or institutions who will be processing and clearing the monetary aspects of the transaction. The security code is appended to or linked to the transaction code, in one of a variety of formats which will be known to persons skilled in the art, to form the transaction security code for the transaction.

Because biometric identification systems must allow for variation in the presentation of the biometric feature and the resultant biometric code, an acceptance variance or range of biometric code values must be established in order to attempt to minimize the occurrence of false acceptance or false rejection of the user. However, by contrast, the inherent and unavoidable variation in the biometric sensor code is an essential attribute of most biometric identification systems that allows them to be used for the methods of the present invention. A biometric identification system that generates an identical code each time that a given biometric feature of a user is presented would be incompatible with the method of the present invention. However, even for biometric identification systems that attempt to force the user to present the biometric feature in the same way each time or utilize a biometric sensor with poor resolution, the biometric sensor code generated will ordinarily have enough inherent and unavoidable variation that the use of the biometric sensor code for a transaction security code will support the generation of a statistically unique and irreproducible transaction security code.

While embodiments of the present invention may provide for identity verification through the use of a biometric identification system as well as providing for the generation of a biometric security code, other embodiments may simply use a biometric sensor to generate the biometric security code and include no biometric identification functions.

Regardless of the nature of the transaction, the transaction code for each transaction may include a plurality of transaction code fields which are appended together or otherwise linked, to create the transaction code. The number of code fields and the size of the code fields, i.e. the number of digits or bits, may vary greatly. The respective code fields may also include code identifiers or code delimiters identifying the start or finish of a code field and/or the nature of code contained in the code field.

The transaction security code that is produced is statistically irreproducible since subsequent presentations of the biometric feature, even by the same user, will not generate the same security code. The effect of the generation of the transaction security code is that the transaction code is locked up and inaccessible for misappropriation or misuse. The transaction security code for each transaction is transmitted to a transaction security code database.

Each transaction and the data base of the present invention, which is comprised of a plurality of transaction security codes, are made secure by the unique transaction security code generated for each transaction. This is possible because each successive presentation of a biometric feature of a user, such as by a finger print, will result in the generation of a unique security code by a biometric identification system, including particularly the system of Johnson, the present inventor, as disclosed in U.S. Pat. No. 5,598,474. At the time of enrollment or first use of the system by the user, the unique security code generated may be used to generate a biometric template or a range of values that may subsequently be used to identify the user and to allow a user to use the data base to store, retrieve, and/or change the data. This biometric template may be used to identify the user any time the user attempts to engage in an authorized transaction or attempts to access the data base. The biometric identification system, whether the system of Johnson U.S. Pat. No. 5,598,474, or an alternative recognition system, will have an acceptance range which will provide for the acceptance of the user despite the inherent variation in the biometric code for successive sensings of the biometric feature of the user. The biometric identification system will be capable of accommodating the variation in the biometric code for the biometric feature of the user, which variation is essential for the generation of the transaction security codes for the method, apparatus and data base of the present invention.

For a particular user, the data base is initially accessed and activated through an enrollment process. The enrollment process may include assigning a data base account number to the user which will be associated with the user and the user's biometric template. This account number may then be provided to the enrolled user via e-mail or other means and may be encoded onto a magnetic card, smart card, radio frequency card, or other devices that provide for or facilitate the authorized use of the account number by the user.

A data base program may provide for the user to use the data base account or access the data base by entering the account number via internet, electronic storage medium interface, magnetic card, smart card, radio frequency card, cell phone, or other means which will be known to persons skilled in the art, and then making a presentation of a biometric feature to a biometric sensor. The biometric sensor transmits a signal or code to a biometric identification system. If the identity of the user is verified, the security code may be appended to the transaction code generated by the transaction input device, thereby creating a transaction security code. Alternatively, the biometric security code may be linked to the transaction code and separately transmitted to the data base processor where the security code is appended to or linked to the transaction code by the data base processor. If the user's identity is not verified by the data base processor, then the transaction may be rejected and the transaction terminated.

If the user's identity is verified by the biometric identification system which is interfaced with the data base processor, the data base processor then checks the other transaction security codes recorded for the user to determine whether the security code has been utilized previously for the user. If it has, the transaction is terminated. If the security code is unique and has never been used before, the transaction is allowed, the security code is appended to or linked with the transaction code, thereby creating the transaction security code which is stored in the data base. Alternatively, the unique security code may also be separately stored in the data base for access by the data base program to identify if the security code is ever used again.

Embodiments of the data base of the present invention may also track all authorized access as well as failed access attempts to the data base. Each time an access attempt is made, the person desiring access presents a biometric feature to a biometric sensor and the biometric identification system processes the biometric sensor code. If the person is an authorized user other than the account owner, such as a bank officer, the accessor user must also be enrolled.

Preferred embodiments of the database of the present invention incorporate a biometric identification system which utilizes a biometric code. The data base of the present invention is not intended for use with a biometric identification system which performs a graphical comparison of a sensed biometric feature with a recorded graphic representation of the biometric feature to authorize and uniquely identify a transaction or access event. The method, apparatus and data base of the present invention rely on a comparison of biometric codes and not on a graphic comparison.

Once the person is enrolled onto or into the financial data base along with the person's personal unique identifier or code that is generated by the computer program or financial institution, it is used in the transaction process. The unique code associated with the biological body part is also used to identify the rightful owner of the data base used to store financial information. This information may include unique identifiers or account numbers. Personal information concerning the person's identity may also include the unique biological code used to identify the person. This code is unique and can only be used once for a transaction. The program checks to see if the unique code has been used in a transaction. If it has the program rejects the transaction.

As stated above, the data base program and the data base may be used to secure a transaction. By generating a unique biometric security code that is associated with a live biometric feature of the user, and associating the biometric security code with a unique transaction, the transaction is secure because if the transaction security code or the biometric security code component of the transaction security code is ever used again the program will reject it and cancel the transaction. The program will determine that the transaction security code has been compromised and consider the transaction fraudulent.

As a transaction is initiated, the program receives the transaction security code, and, if encrypted, it would decrypt the transaction security code. The transaction security code would then be used by the data base program to check each record or transaction stored in the data base. If the security code component of the transaction security code has already been used, the transaction will be rejected and the transaction will be deemed fraudulent. If the security code component of the transaction security code cannot be found associated with a previous transaction then the data base program would allow the transaction to be completed and store the transaction in the data base. The data base could also be encrypted so that the data base program would be required to decrypt the data base or its records before seeing if a match of the biometric security code exists.

Other embodiments may provide that a transaction is initiated by a biometric feature of the user being sensed and the data base program identifying the user and retrieving certain user information, and thereby indicating to a seller that a valid transaction is being initiated. The data base program may then receive and store all of the vital seller information, include such information as banking and payment routing information, as part of the transaction security code. Product information such as purchase price, shipping method, shipping costs, and product warranties may also be received and stored as part of the transaction security code.

The method, apparatus and data base of the present invention may be used to control the transfer of the purchase price allocated for the transaction from the user's account to an escrow account controlled by a financial institution. Once the seller has fulfilled any conditions of the transaction, the purchase price may then be released and transferred to the seller's account.

Another typical transaction for which a transaction security code may be generated through the method and apparatus of the present invention and for the data base of the present invention is a loan transaction. For a loan transaction, the data base program may verify the identity of the user in the manner described above for a purchase transaction. The presentment by the user of a biometric feature serves to verify the identity of the user and results in the generation of a unique biometric security code. The biometric security code is then incorporated into the transaction security code along with the transaction code as described above for a purchase transaction. The loan application, the loan processing, and the loan approval may each result in the generation of a transaction security code, or, alternatively, a transaction security code may be generated for the entire loan transaction. The data base program may also be used to automatically check credit worthiness and automatically reject or allow the loan, based upon other data in the database for the user.

Management of the data base or management of user accounts in the data base may require access by data base managers. Further, access to user accounts in the data base by financial and other institutions may require access by institution representatives. Those individuals or entities may be enrolled on an account by account basis in the manner described above with the access approved by the user prior to or subsequent to enrollment by the user, or may be pre-enrolled for a group or class of users. Data base managers and representatives may have prescribed, limited functions with respect to the accounts. The data base program thus may provide for the user, data base manager, or financial institution representative to add to or modify the transaction security code for a particular transaction in the transaction data base. This may be accomplished by first identifying a valid transaction as described above. The data base program may incorporate a data base security program which controls access to the data base and the transaction security code for specific transactions. The security program may be activated by a biometric identification program which utilizes the biometric security code to confirm the identity of the user, whether it is the account owner, manager, or representative who is seeking access.

As indicated above, the data base program and the data base may provide for the authorization, execution and documentation of escrow transactions. The data base program may incorporate an escrow program to control escrow transactions. The escrow program may determine, based upon the transaction code component of the transaction security code, when the proceeds of an escrow account will be released, the terms and conditions of the release, the recipient, and payment transfer information.

The data base program may also be used to control physical access. Such access control may include access to computers, work stations, buildings, vehicles, rooms, rental rooms, and rental vehicles. Again, the transaction security codes for each such access transaction would provide an audit trail.

The data base program could be used to allow for the dispensing of items that need to be controlled, such as drugs, car keys, and house keys. Positive identification and security code uniqueness provide for security in such dispensing transactions. Again an audit trail is provided from the transaction security codes from each dispensing transaction. In the case of vehicle keys, the transaction data base program may also control what the keys could be used for, such as use for a test drive of a vehicle to determine purchase.

The data base program may adjust for different types of biometric sensors. Variations in the biometric sensor code may occur simply due to the type of sensor used. To allow for this discrepancy, the data base program may ask the user, manager or representative for the type of reader used, or the data base program may be equipped to identify the type of reader from the biometric sensor code generated. The date base program may transform the biometric sensor code based upon the type of sensor used, so that a single biometric template is generated from enrollment and so a converted and compatible biometric security code is generated from each sensing. Alternatively, a collection of biometric templates may be generated from the enrollment process to be used depending upon the biometric sensor used for subsequent sensings.

DETAILED DESCRIPTION

Figure 1:
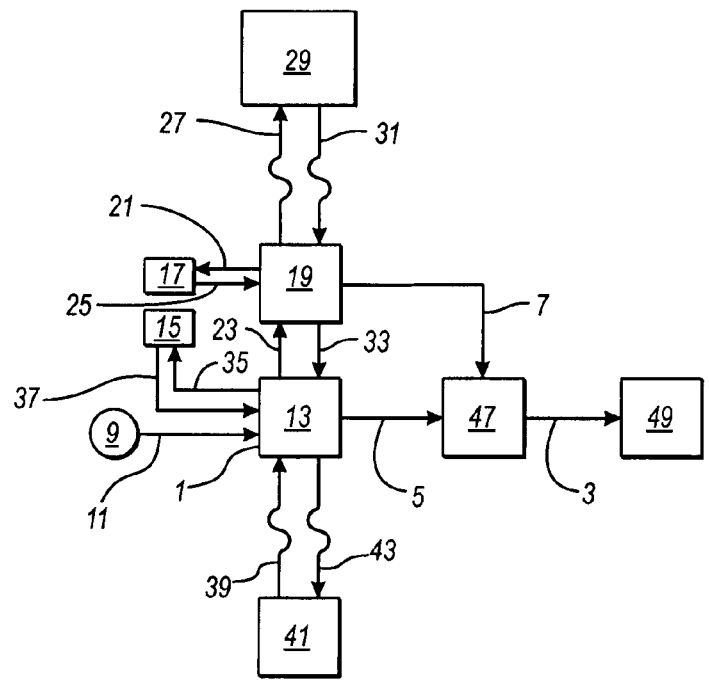
FIG. 1 is a schematic of a preferred embodiment of the apparatus of the present invention used for a retail purchase commercial transaction with a typical front end system and a biometric identification system.
Figure 2:
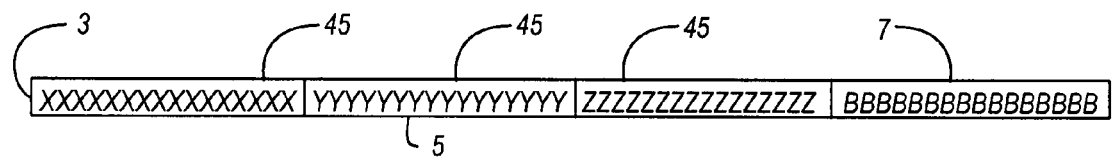
FIG. 2 is a illustration of an embodiment of the structure of a transaction security code of the present invention with a biometric security code appended to a transaction code.

Referring to FIG. 1, a schematic flow chart 1 of a preferred method of the present invention is shown for generating a transaction security code 3, a preferred embodiment of which is illustrated in FIG. 2. For this embodiment, the transaction security code 3 is comprised of a transaction code 5 and a security code 7. A user 9 initiates a transaction 11 which can be one of any number of common commercial or financial transactions, such as a retail purchase with a debit card, an on-line purchase with a credit card, an on-line banking transaction, or a loan application. The transaction code will ordinarily be in a digital format defined by the commercial entity with whom the user is interacting for the transaction and by the financial institution or institutions who will be processing and clearing the monetary aspects of the transaction. For a typical credit card purchase transaction, the transaction code may contain information relating to user identity, vendor identity, transaction type, transaction amount, payment issuing entity, user account number, payment receiving entity, vendor account number, payment routing, and the like. The security code is appended to or linked to the transaction code, in one of a variety of formats which will be known to persons skilled in the art, to form the transaction security code for the transaction. For example, a transaction security code 3 may consist of a transaction code 5 in digital form with a security code 7 in digital form appended to the beginning or end of the transaction code as illustrated in FIG. 2. Alternatives for code structure, including variable code fields and code field delimiters will be known to persons skilled in the art. Alternatively, the transaction code may merely be linked to the security code. Still further, components of the transaction code may merely be linked to other components of the transaction code. Alternatives for appendage or linkage of code will be known to persons skilled in the art.

FIG. 1 illustrates a transaction consisting of a typical retail purchase transaction wherein the user's purchase items are priced and totaled by a front end system 13, and the user elects to pay through use of a card reader 15. For a transaction utilizing this embodiment of the present invention, the user may receive a scan prompt 21 from a biometric identification system 19, which results in a biometric prompt 23 from the front end system for the user to present a biometric feature, such as a finger or a hand, to a biometric sensor 17. The biometric identification system may be a separate system or may be incorporated with the front end system. The biometric sensor transmits a biometric sensor code 25 to the biometric identification system. The biometric identification system transmits a biometric inquiry code 27, which may be the biometric sensor code, to a transaction database system 29 which includes a transaction data base, and receives an identity code 31 from the transaction database system. The biometric identification system transmits an identify verification code 33 to the front end system. The identity verification code verifies or is utilized by the front end system to verify the identity of the user, thereby verifying that the user is the owner or an authorized user of the credit card scanned at the credit card reader 15 and the transaction initiated by the user is allowed and completed. The biometric identification system may also generate the biometric security code 7 for the completed transaction, which again may be identical to the biometric sensor code 25. Likewise, if the transaction is not completed, a transaction security code may nevertheless be generated for the failed transaction. If a transaction security code is generated it may be transmitted to the data base system.

Because biometric identification systems must allow for variation in the presentation of the biometric feature and the resultant biometric code, an acceptance variance or range of biometric code values must be established in order to attempt to minimize the occurrence of false acceptance or false rejection of the user. However, by contrast, the inherent and unavoidable variation in the biometric sensor code is an essential attribute of most biometric identification systems that allows them to be used for the methods of the present invention. A biometric identification system that generates an identical code each time that a given biometric feature of a user is presented would be incompatible with the method of the present invention. However, even for biometric identification systems that attempt to force the user to present the biometric feature in the same way each time or utilize a biometric sensor with poor resolution, the biometric sensor code generated will ordinarily have enough inherent and unavoidable variation that the use of the biometric sensor code for a transaction security code will support the generation of a statistically unique and irreproducible transaction security code.

While the embodiment of the present invention provides for identity verification through the use of a biometric identification system as well as providing for the generation of a biometric security code, other embodiments may simply use a biometric sensor to generate the biometric security code and include no biometric identification functions.

For the embodiment shown in FIG. 1, the front end system also transmits a card prompt 35 to the card reader 15. As the user swipes a card, a card code 37 is transmitted to the front end system. The front end system then transmits a card inquiry code 39 to the appropriate financial institution or other clearing institution 41 and receives a card response code 43, which may be an approval code or a denial code. If the card response code is an approval code, the transaction is normally completed and the front end system generates a transaction code 5. A transaction code is also normally generated if the transaction is not completed.

Figure 5:
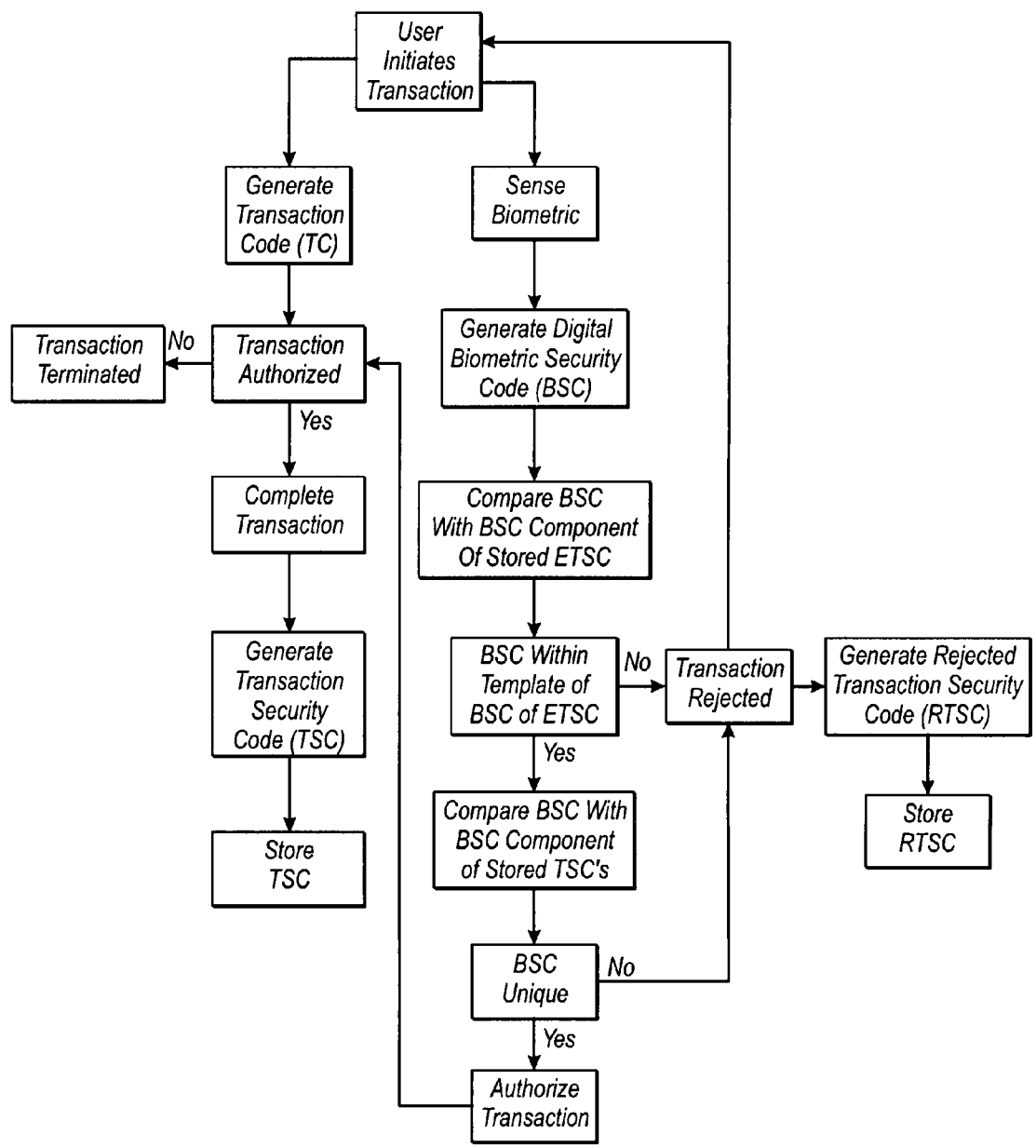
FIG. 5 is a flow chart of a preferred embodiment of the method of the present invention for completing a secured commercial transaction.

Referring also to FIG. 5, a flow chart of a preferred embodiment of the method of the present invention for completing a secured commercial transaction is presented.

Referring also to FIG. 2, regardless of the nature of the transaction, the transaction code for each transaction may include a plurality of transaction code fields 45 which are appended together, as illustrated in FIG. 2, or otherwise linked, to create the transaction code 5. The number of code fields and the size of the code fields, i.e. the number of digits or bits, may vary greatly, and the respective code fields may, for example, comprise digital codes for transaction date, transaction time, credit card number of the user or originator of the transaction, transaction approval codes, vendor codes identifying the vendor of a retail item purchased, the purchase price, the routing number of the user or the vendor's bank account, the bank account number of the user or the vendor, or various other codes relating to or identifying the transaction. Alternatively, the code fields may simply include an identifier for a specific database and a transaction number for that database. The respective code fields may also include code identifiers or code delimiters identifying the start or finish of a code field and/or the nature of code contained in the code field.

As described above, the user presents a biometric feature to a biometric sensor 17 which is linked to a biometric identification system 19. A biometric sensor code 25 is transmitted from the biometric sensor to the biometric identification system. The biometric identification system then generates a digital biometric security code 7 based upon the presentation of the biometric feature of the user. Inherent and unavoidable variance in the presentation of the biometric feature and the very high degree of resolution of biometric sensors result in the biometric sensor code and thus the biometric security code being unique. For example, inherent variation in the amount of pressure exerted by the user on a fingerprint sensor alone will result in a variation in the biometric sensor code. Other variations such as lateral rotation or longitudinal rotation of a finger will also result in variance in the biometric sensor code. The result is that for each presentation of the biometric feature by the user, a statistically unique biometric sensor code and thus a statistically unique security code will be generated. This unique biometric security code 7 is transmitted to a transaction security code generator 47 as is the transaction code 5. The transaction security code generator appends or links the biometric security code to the transaction code, thereby generating the transaction security code 3. FIG. 2 illustrates an example of how the security code may be appended to the transaction code to form a transaction security code.

The transaction security code 3 that is produced is statistically irreproducible since subsequent presentations of the biometric feature, even by the same user, will not generate the same security code. The effect of the generation of the transaction security code is that the transaction code is locked up and inaccessible for misappropriation or misuse. The transaction security code for each transaction is transmitted to a transaction security code database 49. The transaction security code database may be incorporated or linked with the biometric database 29.

An alternative embodiment of the foregoing method may eliminate the verification of the identity of the user before authorizing the transaction and generating the transaction security code.

Each transaction and the data base of the present invention, which is comprised of a plurality of transaction security codes, are made secure by the unique transaction security code generated for each transaction. As indicated above, this is possible because each successive presentation of a biometric feature of a user, such as by a finger print, will result in the generation of a unique security code by a biometric identification system, including particularly the system of Johnson, the present inventor, as disclosed in U.S. Pat. No. 5,598,474. At the time of enrollment or first use of the system by the user, the unique security code generated may be used to generate a biometric template or a range of values that may subsequently be used to identify the user and to allow a user to use the data base to store, retrieve, and/or change the data.

Figure 4:
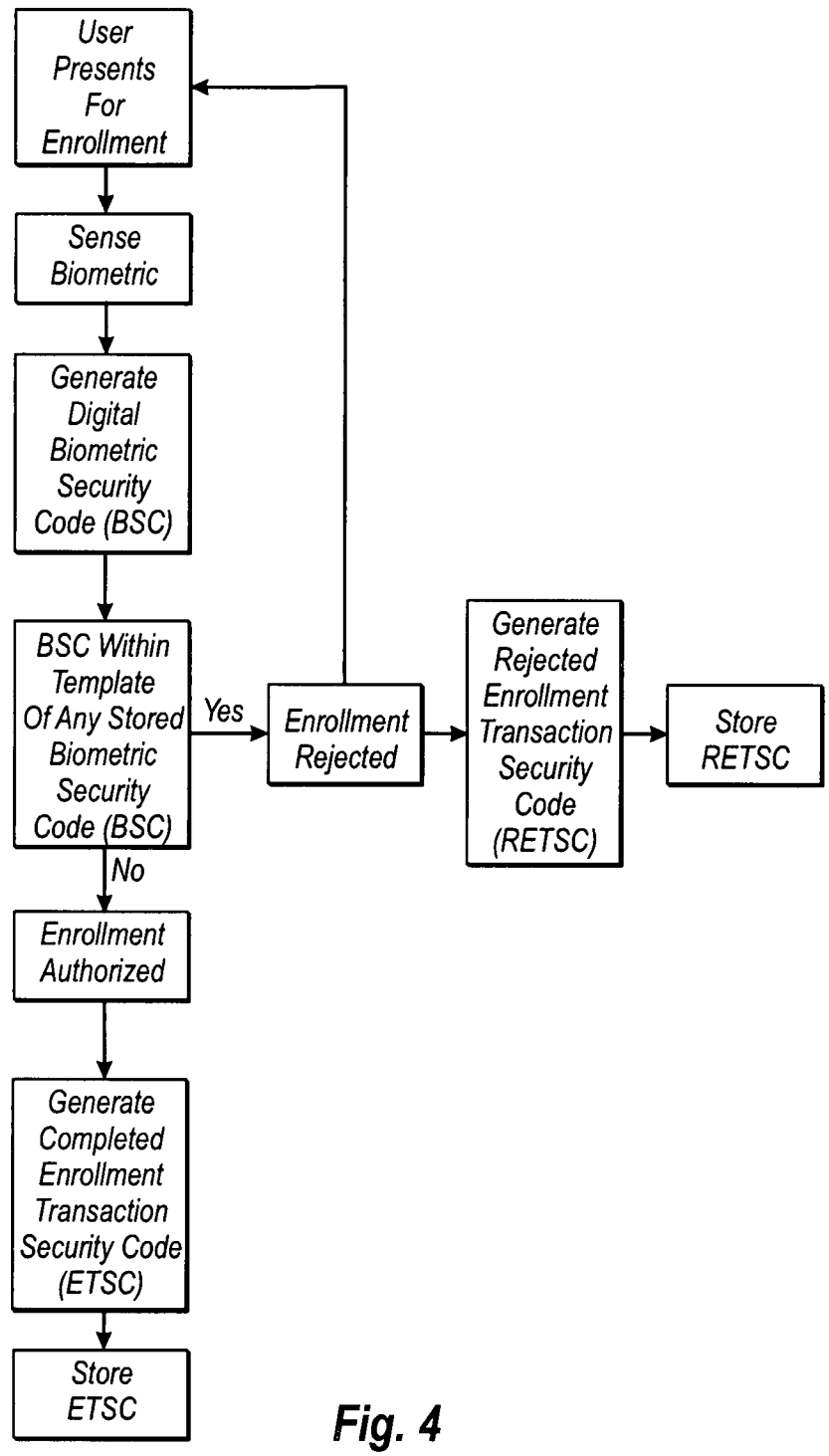
FIG. 4 is a flow chart of a preferred embodiment of the method of the present invention for enrolling users for a transaction database.

For a particular user, the data base is initially accessed and activated through an enrollment process. The data base program that controls access to the data base may require the user to have been pre-enrolled as an authorized user. Referring to FIG. 4, a flow chart of a preferred embodiment of the method of the present invention for enrolling users for a transaction database is presented. In the enrollment process, a biometric feature of the user is presented to a biometric sensor. The biometric feature may be a finger print, hand print, retina, voice print, or other biometric feature. The biometric feature of the user is sensed and the biometric identification system generates a biometric security code for the biometric feature, which, according to present technology, may be a digital code. The biometric security code may then be used to generate a biometric template that constitutes a range of biometric code values that are recognized as representing the user. This biometric template may be used to identify the user any time the user attempts to engage in an authorized transaction or attempts to access the data base.

The enrollment process may also include assigning a data base account number to the user which will be associated with the user and the user's biometric template. This account number may then be provided to the enrolled user via e-mail or other means and may be encoded onto a magnetic card, smart card, radio frequency card, or other devices that provide for or facilitate the authorized use of the account number by the user.

The enrollment process may also consist of obtaining the account number from a financial institution that provides an account to the user. A PIN number or other unique identifier assigned to the user by the financial institution for that account may be incorporated into the enrollment process. The PIN number may be used at a transaction generation point to identify the accounts that are coupled to that person. The account number and the PIN number may be on a card, portable memory device, or entered by hand at a terminal that allows a person to enter the information by hand.

FIG. 5 is a flow chart of a preferred embodiment of the method of the present invention for completing a secured commercial transaction.

The data base program may provide for the user to use the data base account or access the data base by entering the account number via internet, electronic storage medium interface, magnetic card, smart card, radio frequency card, cell phone, or other means which will be known to persons skilled in the art. To use or access the data base the user may rely on a transaction input device. This device could be a computer, credit card reader, debit card reader, radio frequency card reader, keyboard, portable input device, or other transaction input device known to persons skilled in the art. A biometric sensor, which is interconnected with the biometric identification system may be interfaced with the transaction input device. As the transaction is initiated, the user presents the biometric feature to the biometric sensor and a biometric sensor code from the sensed biometric feature is generated. The biometric security code may then be generated based on the biometric sensor code. The biometric sensor code or the biometric security code may be transmitted to the data base processor for verification, by interface with the biometric identification system, of the identity of the user. If the identity of the user is verified, the security code may be appended to the transaction code generated by the transaction input device, thereby creating a transaction security code. Alternatively, the biometric security code may be linked to the transaction code and separately transmitted to the data base processor where the security code is appended to or linked to the transaction code by the data base processor.

If the user's identity is not verified by the data base processor, then the transaction may be rejected and the transaction terminated.

If the user's identity is verified by the biometric identification system which is interfaced with the data base processor, the data base processor then checks the other transaction security codes recorded for the user to determine whether the security code has been utilized previously for the user. If it has, the transaction is terminated. If the security code is unique and has never been used before, the transaction is allowed, the security code is appended to or linked with the transaction code, thereby creating the transaction security code which is stored in the data base. Alternatively, the unique security code may also be separately stored in the data base for access by the data base program to identify if the security code is ever used again.

In addition to checking the security code component of the transaction security code for uniqueness, the entire transaction security code may also be checked for uniqueness. If an exact match for the transaction security code is found in the data base, then a perpetrator is obviously attempting to duplicate a commercial transaction by the user, such as a duplicate charge on a credit card purchase. If only the security code component has been duplicated, then a perpetrator is attempting to misappropriate the security code for a fraudulent transaction, such as a fraudulent credit card purchase.

As indicated above, with the biometric identification system of Johnson U.S. Pat. No. 5,598,474 and many other biometric identification systems, successive sensings of a biometric feature, including particularly a fingerprint or a voice print, will result in the generation of unique and distinct biometric sensor codes for each sensing. A transaction security system which does not require a unique transaction security code, provides an opportunity, in the present environment of identity theft and electronic fraud, for a transaction security code, even one ostensibly requiring biometric verification, to be reused by someone other than the authorized person. However, if the transaction security code can only be used once, then capturing that code would be of no use to the perpetrator. The transaction security code or the security code element of the transaction security code would be identified by the data base program as a code that had already been used and the transaction would be rejected.

Further, to prevent a perpetrator from attempting to make a slight change to the security code to attempt to get the data base program to accept the transaction security code and thus accept the transaction, the transaction can also be encrypted so that any change would be identified by the program as a fraudulent alteration and the transaction would be rejected as a fraudulent transaction.

A biometric template may be generated during the enrollment process which will provide a target biometric code for use in the recognition of the user for subsequent sensings of the biometric feature of the user. The biometric identification system, whether the system of Johnson U.S. Pat. No. 5,598, 474, or an alternative recognition system, will have an acceptance range which will provide for the acceptance of the user despite the inherent variation in the biometric code for successive sensings of the biometric feature of the user. The biometric identification system will be capable of accommodating the variation in the biometric code for the biometric feature of the user, which variation is essential for the generation of the transaction security codes for the data base of the present invention.

Embodiments of the data base of the present invention may also track all authorized access as well as failed access attempts to the data base. Each time an access attempt is made, the person desiring access presents a biometric feature to a biometric sensor and the biometric identification system processes the biometric sensor code. If the person is an authorized user other than the account owner, such as a bank officer, the accessor user must also be enrolled. For an authorized accessor user such as a bank officer or a credit card administrator, the user may be authorized for all or a defined portion of the data base. However, the data base provides for security against misuse of the data base by such accessors by generating a transaction code for the access transaction and a security code for the unique sensing of the biometric feature of the accessor which permits the access to the data base. Thus the transaction security code will identify the exact transaction completed by the accessor and will identify the accessor who completed the transaction. As with access by the primary user, a re-use of a transaction security code for access by another authorized accessor user will not be permitted. This will thus require an actual presentation of a biometric feature of the authorized and enrolled accessor user to a biometric sensor each time access by the accessor is desired, and a unique transaction security code will be generated and stored in the data base for each such access attempt.

It should be noted that preferred embodiments of the database of the present invention incorporate a biometric identification system which utilizes a biometric code. The data base of the present invention is not intended for use with a biometric identification system which performs a graphical comparison of a sensed biometric feature with a recorded graphic representation of the biometric feature to authorize and uniquely identify a transaction or access event. The method, apparatus and database of the present invention rely on a comparison of biometric codes and not on a graphic comparison.

Another embodiment of the data base may provide for securing future transactions. For example, the data base program may provide for a payment initiated by the user and authorized by a financial institution such as a credit card company, to be transferred to a designated escrow until delivery or until delivery and the return guarantee period has expired. Once delivery and or the guarantee period has expired then the funds can be released to the vendor. This makes it possible to secure both sides of the transaction. The seller is assured payment if the product is delivered according to the terms and conditions of the sale.

Once the person is enrolled onto or into the financial data base along with the person's personal unique identifier or code that is generated by the computer program or financial institution, it is used in the transaction process. The unique code associated with the biological body part is also used to identify the rightful owner of the data base used to store financial information. This information may include unique identifiers or account numbers. Personal information concerning the person's identity may also include the unique biological code used to identify the person. This code is unique and can only be used once for a transaction. The program checks to see if the unique code has been used in a transaction. If it has the program rejects the transaction.

Other embodiments may provide for a further increased level of security by providing for the encryption of the transaction security code. This increases the difficulty in using the transaction security code to produce a fraudulent transaction security code or to misuse any component or aspect of the transaction security code. A transaction is considered any operation that changes a record stored in the data base, an operation that adds a new transaction, an operation that manipulates the data base program, or an operation accessing any of the programs, records, or data within the database.

As stated above, the data base program and the data base may be used to secure a transaction. By generating a unique biometric security code that is associated with a live biometric feature of the user, and associating the biometric security code with a unique transaction, the transaction is secure because if the transaction security code or the biometric security code component of the transaction security code is ever used again the program will reject it and cancel the transaction. The program will determine that the transaction security code has been compromised and consider the transaction fraudulent.

As a transaction is initiated, the program receives the transaction security code, and, if encrypted, it would decrypt the transaction security code. The transaction security code would then be used by the data base program to check each record or transaction stored in the data base. If the security code component of the transaction security code has already been used, the transaction will be rejected and the transaction will be deemed fraudulent. If the security code component of the transaction security code cannot be found associated with a previous transaction then the data base program would allow the transaction to be completed and store the transaction in the data base. The data base could also be encrypted so that the data base program would be required to decrypt the data base or its records before seeing if a match of the biometric security code exists.

Other embodiments may provide that a transaction is initiated by a biometric feature of the user being sensed and the data base program identifying the user and retrieving certain user information, and thereby indicating to a seller that a valid transaction is being initiated. The data base program may then receive and store all of the vital seller information, include such information as banking and payment routing information, as part of the transaction security code. Product information such as purchase price, shipping method, shipping costs, and product warranties may also be received and stored as part of the transaction security code.

Transfer of the purchase price allocated for the transaction may then be made from the user's account to an escrow account controlled by a financial institution. Once the seller has fulfilled any conditions of the transaction, the purchase price may then be released and transferred to the seller's account. Conditions may include such items as the passage of a thirty day product trial or return period. Notification may then be provided to seller that the funds have been transferred to a financial institution in the seller's name. If the user, within the thirty day trial period, sends the product back, the seller may be notified that the buyer is not satisfied with the product and the funds in escrow may be returned to the user's account and the transaction canceled. All of the data relating to the transaction may be incorporated into the transaction security code for the transaction. The incorporation of the security code generated from the present sensing of the biometric feature of the user insures that the transaction security code is unique.

Another typical transaction for which a transaction security code may be generated through the method and apparatus of the present invention and for the data base of the present invention is a loan transaction. For a loan transaction, the data base program may verify the identity of the user in the manner described above for a purchase transaction. The presentment by the user of a biometric feature serves to verify the identity of the user and results in the generation of a unique biometric security code. The biometric security code is then incorporated into the transaction security code along with the transaction code as described above for a purchase transaction. The loan application submitted by the user and processed by the lender or the loan broker may result in a transaction code incorporating information from the user, the loan broker, the lender, and the and the underwriter, which, when incorporated with a unique security code generated from a present sensing of a biometric feature of the user, comprises a unique transaction security code for the loan application of the user. Similarly, a transaction code may be generated for an issued loan transaction, which, again incorporated with a unique security code generated from a sensing of a biometric feature of the user, comprises a unique transaction security code for the loan transaction. Alternatively, a transaction security code may be generated for the entire loan transaction, including the loan application and the issue loan transaction.

As stated above, the data base program may rely upon the biometric identification system of Johnson U.S. Pat. No. 5,598,474 or other known biometric identification systems for the verification of the identity of the user and for the generation of the unique biometric security code. The transaction security code is then produced and the data base program may then verify that the security code component of the transaction security code has not been used previously. Once the identity of the user is verified and the security code component is determined to be unique, the loan broker, lender, or underwriter, may proceed with loan application processing, including activities such as verifying credit worthiness, with the credit worthiness incorporated with other information as part of the transaction code for the loan application. When the lender approves or rejects the application, that information may also be added to the transaction code and thus to the transaction security code. The data base program may also be used to automatically check credit worthiness and automatically reject or allow the loan, based upon other data in the database for the user.

Figure 3:
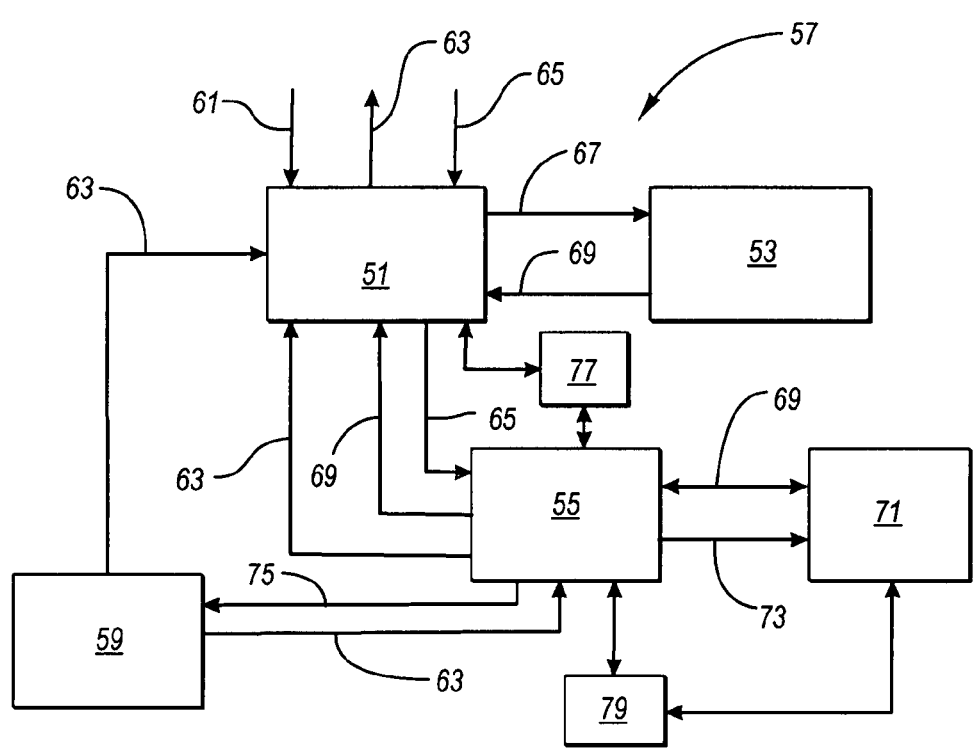
FIG. 3 is a schematic flow chart of a preferred embodiment of a data base program for a transaction data base of the present invention.

Referring to FIG. 3, an embodiment of the data base program 57 may include a data base security program 51 that may define and direct the operation on the data base. The data base security program may accept a biometric sensor code 61 along with commands 63 and a transaction code 65. The data base security program identifies the person trying to access the data base by determining the type of biometric sensor used to generate the biometric sensor code, generating a biometric security code 67 based upon the biometric sensor code and the type of sensor, and transmitting the biometric security code to a decipher program 53. The decipher program may initially determine if the biometric security code is encrypted. If it is, the decipher program may decrypt the biometric security code. The decrypted biometric security code 69 is then returned to the data base security program. The data base main program 55 may then identify the unique biometric security code. The biometric security code may be compared against the biometric security code for previously completed transactions for which a transaction security code has been previously stored in the transaction data base 71 to determine if the biometric security code has been previously used. The biometric security code comparison 75 may then be used by the command program 59. It the biometric security code has been used previously, the transaction may be terminated by the data base main program and assumed to be an unauthorized access attempt. If it has not previously been used the data base security program determines if the biometric security code is within a biometric template of a biometric security code of an authorized enrolled user. If it is not, the data base main program again terminates the action. If the security code is deemed to be authorized to access the transaction data base, the command program 59 may determine what action is to be completed by the main data base program, which may include a command 63 to authorize the completion of the transaction and the storage of the transaction security code 73 for the transaction in the transaction data base 71.

Management of the data base or management of user accounts in the data base may require access by data base managers. Further, access to user accounts in the data base by financial and other institutions may require access by institution representatives, referred to herein as "representative" or "representatives". Those individuals or entities may be enrolled on an account by account basis in the manner described above with the access approved by the user prior to or subsequent to enrollment by the user. Alternatively, data base managers or representatives may be pre-enrolled for a group or class of users. Data base managers and representatives may have prescribed, limited functions with respect to the accounts, such as data extraction or modification or adding additional codes to transaction security codes or the transaction code component of the transaction security codes. The managers or representatives may also be authorized to add or remove persons enrolled for the data base.

The data base program thus may provide for the user, data base manager, or financial institution representative to add to or modify the transaction security code for a particular transaction in the transaction data base. This may be accomplished by first identifying a valid transaction as described above. The data base program will then permit additions or modifications to the data base for a particular transaction, such as the code for "product delivered", "escrow released" or the like. The data base program may also permit removal of a transaction security code for a particular transaction by a data base manager or financial institution representative upon the occurrence of certain events or contingencies. The data base program may also provide for the automatic removal of the transaction security code for certain transactions based upon the occurrence of certain events, such as the passage of a pre-determined amount of time from the date of initiation or completion of the transaction.

As indicated above, the data base program and the data base may provide for the authorization, execution and documentation of escrow transactions. Referring again to FIG. 3, the data base program 57 may incorporate an escrow program 79 to control escrow transactions. The escrow program may determine by the command or request received by the data base program from a user, including an account owner, a manager, or financial institution representative, that it is an escrow transaction. Once it has been determined that it is an escrow transaction, the transaction security code for the transaction will contain executable code that will cause the data base program to await certain events, such as the passage of a pre-determined amount of time without a product rejection notice from the user. Alternatively, the transaction security code may simply allow modification by request from the enrolled user, manager, or representative, to initiate or confirm escrow release or disallowance. The escrow release or disallowance event or confirmation may then become part of the transaction security code for the transaction or a new transaction security code may be generated for the escrow transaction.

The escrow program may determine, based upon the transaction code component of the transaction security code, when the proceeds of an escrow account will be released, the terms and conditions of the release, the recipient, and payment transfer information. It may provide, for example, that escrow funds are released to a seller or a third party when shipment is confirmed, product is received, a trial period has expired, or a guarantee period has expired. It may also provide for return to the user, if, for example, delivery is untimely, delivery is refused, or a return option is timely exercised within a trial period.

Embodiments of the apparatus and method of the present may also provide for a digital or digitized image of the biometric feature or some other body part, of the user, manager, or representative, to be incorporated with, appended to, or linked to the transaction security code for a transaction. This can provide an additional measure of security for the transaction.

Referring again to FIG. 3, as indicated above, the data base program may incorporate a data base security program 51 which controls access to the data base and the transaction security code for specific transactions. The security program may be activated by a biometric identification program 77 which utilizes the biometric security code 69 to confirm the identity of the user, whether it is the account owner, manager, or representative who is seeking access. Once the data base security program has received a security code or a transaction security code with a security code incorporated therein, it searches its data base to determine if the security code is unique or has been previously used. If the security code component has been used, then the security program refuses access to the protected data base and its transaction security codes. If the security code has not been used previously, then the security program may allow access to the protected data base and one or more transaction security codes. The security program may also provide for encryption of the transaction security code for each transaction. For example, the location of a transaction security code in the data base memory may be encrypted by the security program. The location may then decrypted by the decipher program or the security program when access is requested by an authorized user, manager, or representative, whose identity is confirmed and it is confirmed that the security code is unique.

The security program may also be used to protect programs in computer memory or remote memory devices including removable storage disks. The data base security program may protect unwanted access to computer files, and program operation inside the computer system. The program may decrypt the program as it is used. The computer system may register all program files that are open for operation and tell the computer system where in the memory the files and programs are located and may be encrypted by the security program. The security program then decrypts the memory files as they are needed by the computer system to operate the programs. This allows the security program to hide all of the vital information used by the computer to operate the computer from unauthorized intruders. The information passed back and forth from the computer system to the security program and from the security program to the computer system is encrypted as it is passed from the computer system to the security program and then decrypted when information is passed from the security program to the computer system.

When a portable or removable storage device is used to store information the security program may also be stored on the device. When the device is used to store new information or to change information or to retrieve information the data base security program may be downloaded first into the computer system. The security program may then ask the biometric identification program if a positive identification of the user to the information has been made. If the security program has received a positive identification, then the data security program may search the data base that holds the unique security code generated by the biometric identification program has been used. If it has, the security program rejects access. If the security code has not been used the access may be allowed and the program allow access to the information stored, changes stored data or stores new data. The security program may then update the data base, adding the new transaction security code, including the appended or linked security code component, to the transaction data base.

The transaction data base program may also add to or modify a transaction security code each time that access is granted to the transaction security code, or may maintain a separate transaction security code, which will thereby constitute an audit trail as to who is allowed to access the transaction security code or any account associated therewith and for what purpose. The transaction program may control access to the transaction security codes and the associated account and control what each person can and cannot do with the information stored in the account. The transaction data base program may add to or modify the transaction security code, or generate a separate transaction security code, for any and all information concerning the person or persons accessing the data base, which would be part of the audit trail.

The transaction data base program may also be used to control access to various types of information or media, such as music, videos, games, and personal information. The transaction data base program may also be used to control the use and access to computer programs. It would be used to allow programs to be activated by a designated person or persons and provide an audit trail for the persons accessing the programs. User identification may first be made and then the uniqueness of the security code would prevent reuse of previously generated and fraudulently appropriated transaction security codes or security codes.

The transaction data base program may also be used to control physical access. Such access control may include access to computers, work stations, buildings, vehicles, rooms, rental rooms, and rental vehicles. Again, the transaction security codes for each such access transaction would provide an audit trail.

The transaction data base program could be used to allow for the dispensing of items that need to be controlled, such as drugs, car keys, and house keys. Positive identification and security code uniqueness provide for security in such dispensing transactions. Again an audit trail is provided from the transaction security codes from each dispensing transaction.

In the case of vehicle keys, the transaction data base program may also control what the keys could be used for, such as use for a test drive of a vehicle to determine purchase. In this case the data base program could be used to automate loan approval and automate sale of the vehicle. The same could be true for the real estate purchase transactions, with the data base program approving access for inspection, approving a purchase loan, and automating the sale. Identity verification of the buyer would be made from a security code or transaction security code with verification of the uniqueness of the code validating the transaction.

Multiple persons can operate out of the same data base record. This is accomplished by allowing more than one fingerprint identification number per transaction and or control record for that data base. To enroll more than one user into the data base and its associated data base program, the process for enrolling a user as described above is repeated for multiple applicants or for multiple finger prints or other biometric inputs for one applicant. Along with the process of allowing for more than one applicant or for more than one biometric, the data base program may provide for the protection of the data from forced entry by the user, manager, or representative being forced to present their finger print or other biometric against their will. This may be accomplished by allowing a certain finger print or a sequence of finger prints to alert the program that this is not a valid entry and take appropriate steps to protect the user and the data.

The data base program may adjust for different types of biometric sensors. Variations in the biometric sensor code may occur simply due to the type of sensor used. To allow for this discrepancy, the data base program may ask the user, manager or representative for the type of reader used, or the data base program may be equipped to identify the type of reader from the biometric sensor code generated. The date base program may transform the biometric sensor code based upon the type of sensor used, so that a single biometric template is generated from enrollment and so a converted and compatible biometric security code is generated from each sensing. Alternatively, a collection of biometric templates may be generated from the enrollment process to be used depending upon the biometric sensor used for subsequent sensings.

All of the foregoing functions may be controlled by the data base setup program for that user. The user may describe what functions the program will do according to the setup program and parameters entered at that time. The data base program may allow for changes to be made to the setup portion of the program at any time. These changes may be controlled by the control access portion of the program.

Other variations and versions of the foregoing description of an embodiment of a program structure for the method and apparatus of the present invention will be known to persons skilled in the art.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. Computer-readable medium having a database of a plurality of unique transaction security codes, each transaction security code comprising a transaction code and a unique biometric security code which is appended to the transaction code, the transaction code being generated from a commercial transaction of a user and the unique biometric security code being determined from a unique biometric sensor code generated from a biometric presentation of a finger of the user to a fingerprint sensor, the uniqueness of the biometric sensor code resulting from an inherent uniqueness in the biometric presentation which results from an inherent variation of one or more of a group consisting of the amount of pressure exerted by the user on the fingerprint sensor, lateral rotation of the finger, longitudinal rotation of the finger, and other variation in the biometric presentation of the finger to the fingerprint sensor, and a resolution of the fingerprint sensor, the transaction security code being statistically irreproducible, a subsequent presentation of the finger by the user not generating the same biometric security code, the uniqueness of the biometric security code and the resultant uniqueness of the transaction security code providing for a check against other transaction security codes in the database to detect any attempted fraudulent reuse of a biometric security code for a prior commercial transaction in the database.

2. The computer-readable medium having the database as recited in claim 1 wherein the biometric security code is the biometric sensor code.

3. The computer-readable medium having the database as recited in claim 1 wherein the resolution of the biometric sensor is sufficient to differentiate the inherent uniqueness of the biometric presentation as contrasted to a previous or subsequent biometric presentation of the biometric feature of the user.

4. Computer-readable medium having a database of a plurality of unique transaction security codes, each transaction security code comprising a unique security code appended to a transaction code, the security code being based upon a biometric sensor code generated by a fingerprint sensor from a biometric presentation of a finger of a user, and the transaction code being based upon one or more transactions for the user, the transaction security code being statistically irreproducible, a subsequent presentation of the biometric feature by the user not generating the same security code due to an inherent variation of one or more of a group consisting of the amount of pressure exerted by the user on the fingerprint sensor, lateral rotation of the finger, longitudinal rotation of the finger, and other variation in the biometric presentation of the finger to the fingerprint sensor, the uniqueness of the biometric security code and the resultant uniqueness of the transaction security code providing for a check against other transaction security codes in the database to detect any attempted fraudulent reuse of a biometric security code for a prior commercial transaction in the database.

5. Computer-readable medium having a database of a plurality of unique transaction security codes, each transaction security code comprising a unique security code appended to a transaction code, the security code being based upon a biometric sensor code generated by a fingerprint sensor from a biometric presentation of a finger of a user, and the transaction code being based upon a transaction selected by the user, the transaction security code being statistically irreproducible, a subsequent presentation of the biometric feature by the user not generating the same security code due to an inherent variation of one or more of a group consisting of the amount of pressure exerted by the user on the fingerprint sensor, lateral rotation of the finger, longitudinal rotation of the finger, and other variation in the biometric presentation of the finger to the fingerprint sensor, the uniqueness of the biometric security code and the resultant uniqueness of the transaction security code providing for a check against other transaction security codes in the database to detect any attempted fraudulent reuse of a biometric security code for a prior commercial transaction in the database.

6. Computer-readable medium having a database of a plurality of unique user enrollment security codes, each user enrollment security code comprising a unique security code appended to a user enrollment code, the security code being based upon a biometric sensor code generated by a fingerprint sensor from a biometric presentation of a finger of a user, and the user enrollment code being based upon one or more user enrollment transactions for the user, the enrollment security code being statistically irreproducible, a subsequent presentation of the biometric feature by the user not generating the same security code due to an inherent variation of one or more of a group consisting of the amount of pressure exerted by the user on the fingerprint sensor, lateral rotation of the finger, longitudinal rotation of the finger, and other variation in the biometric presentation of the finger to the fingerprint sensor, the uniqueness of the biometric security code and the resultant uniqueness of the transaction security code providing for a check against other transaction security codes in the database to detect any attempted fraudulent reuse of a biometric security code for a prior commercial transaction in the database.

7. Computer-readable medium having a database of a plurality of unique transaction security codes, each transaction security code comprising a transaction code and a unique biometric security code which is linked to the transaction code, the transaction code being generated from a commercial transaction of a user and the unique biometric security code being determined from a unique biometric sensor code generated from a biometric presentation of a finger of the user to a fingerprint sensor, the uniqueness of the biometric sensor code resulting from an inherent uniqueness in the biometric presentation which results from an inherent variation of one or more of a group consisting of in the amount of pressure exerted by the user on the fingerprint sensor, lateral rotation of the finger, longitudinal rotation of the finger, and other variation in the biometric presentation of the finger to the fingerprint sensor, and a resolution of the fingerprint sensor, the transaction security code being statistically irreproducible, a subsequent presentation of the finger by the user not generating the same biometric security code, the uniqueness of the biometric security code and the resultant uniqueness of the transaction security code providing for a check against other transaction security codes in the database to detect any attempted fraudulent reuse of a biometric security code for a prior commercial transaction in the database.

8. The computer-readable medium having the database as recited in claim 7 wherein the biometric security code is the biometric sensor code.

9. The computer-readable medium having the database as recited in claim 7 wherein the resolution of the biometric sensor is sufficient to differentiate the inherent uniqueness of the biometric presentation as contrasted to a previous or subsequent biometric presentation of the biometric feature of the user.

10. Computer-readable medium having a database of a plurality of unique transaction security codes, each transaction security code comprising a unique security code linked to a transaction code, the security code being based upon a biometric sensor code generated by a fingerprint sensor from a biometric presentation of a finger of a user, and the transaction code being based upon one or more transactions for the user, the transaction security code being statistically irreproducible, a subsequent presentation of the biometric feature by the user not generating the same security code due to an inherent variation of one or more of a group consisting of the amount of pressure exerted by the user on the fingerprint sensor, lateral rotation of the finger, longitudinal rotation of the finger, and other variation in the biometric presentation of the finger to the fingerprint sensor, the uniqueness of the biometric security code and the resultant uniqueness of the transaction security code providing for a check against other transaction security codes in the database to detect any attempted fraudulent reuse of a biometric security code for a prior commercial transaction in the database.

11. Computer-readable medium having a database of a plurality of unique transaction security codes, each transaction security code comprising a unique security code linked to a transaction code, the security code being based upon a biometric sensor code generated by a fingerprint sensor from a biometric presentation of a finger of a user, and the transaction code being based upon a transaction selected by the user, the transaction security code being statistically irreproducible, a subsequent presentation of the biometric feature by the user not generating the same security code due to an inherent variation of one or more of a group consisting of the amount of pressure exerted by the user on the fingerprint sensor, lateral rotation of the finger, longitudinal rotation of the finger, and other variation in the biometric presentation of the finger to the fingerprint sensor, the uniqueness of the biometric security code and the resultant uniqueness of the transaction security code providing for a check against other transaction security codes in the database to detect any attempted fraudulent reuse of a biometric security code for a prior commercial transaction in the database.

12. Computer-readable medium having a database of a plurality of unique user enrollment security codes, each user enrollment security code comprising a unique security code linked to a user enrollment code, the security code being based upon a biometric sensor code generated by a fingerprint sensor from a biometric presentation of a finger of a user, and the user enrollment code being based upon one or more user enrollment transactions for the user, the enrollment security code being statistically irreproducible, a subsequent presentation of the biometric feature by the user not generating the same security code due to an inherent variation of one or more of a group consisting of the amount of pressure exerted by the user on the fingerprint sensor, lateral rotation of the finger, longitudinal rotation of the finger, and other variation in the biometric presentation of the finger to the fingerprint sensor, the uniqueness of the biometric security code and the resultant uniqueness of the transaction security code providing for a check against other transaction security codes in the database to detect any attempted fraudulent reuse of a biometric security code for a prior commercial transaction in the database.

* * * * *